Jan. 29, 1952     H. A. ALEXANDERSON ET AL     2,583,537
ENGINE CONTROL
Filed June 6, 1947     4 Sheets-Sheet 1
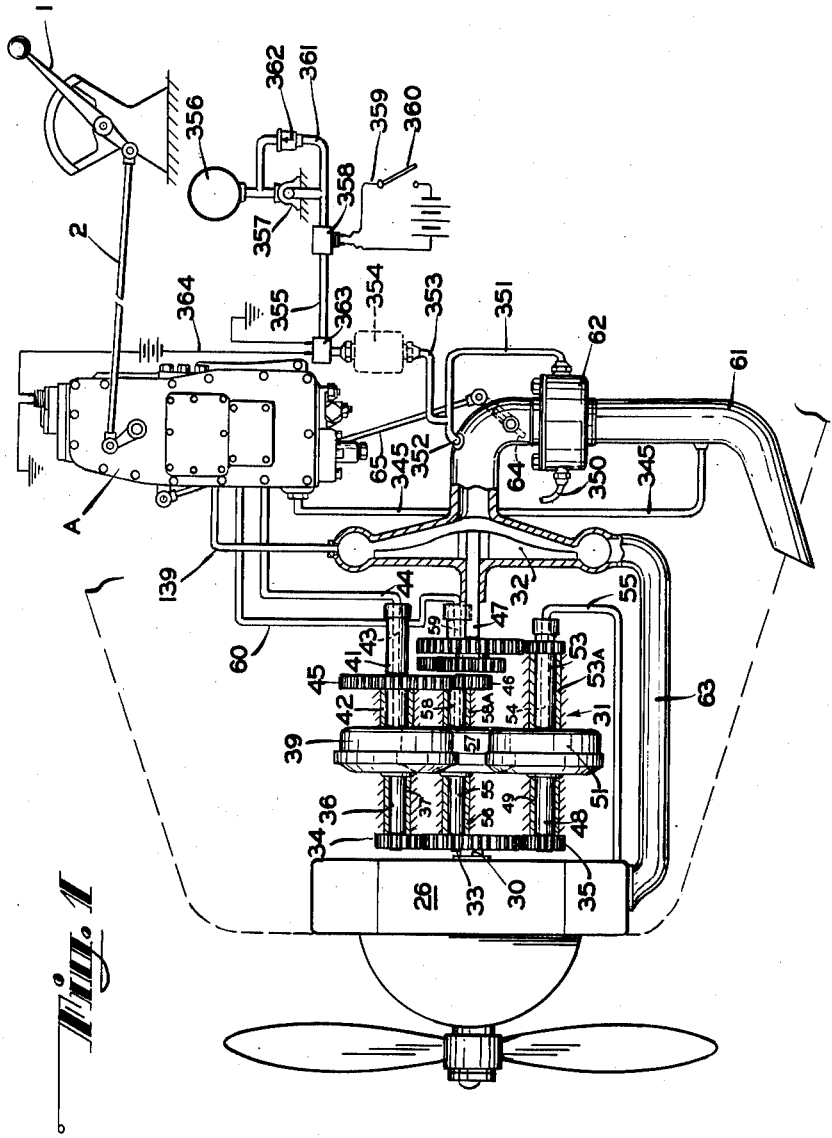
INVENTORS
HOWARD A. ALEXANDERSON
ARTHUR H. LE FEBVRE
-ATTORNEY-

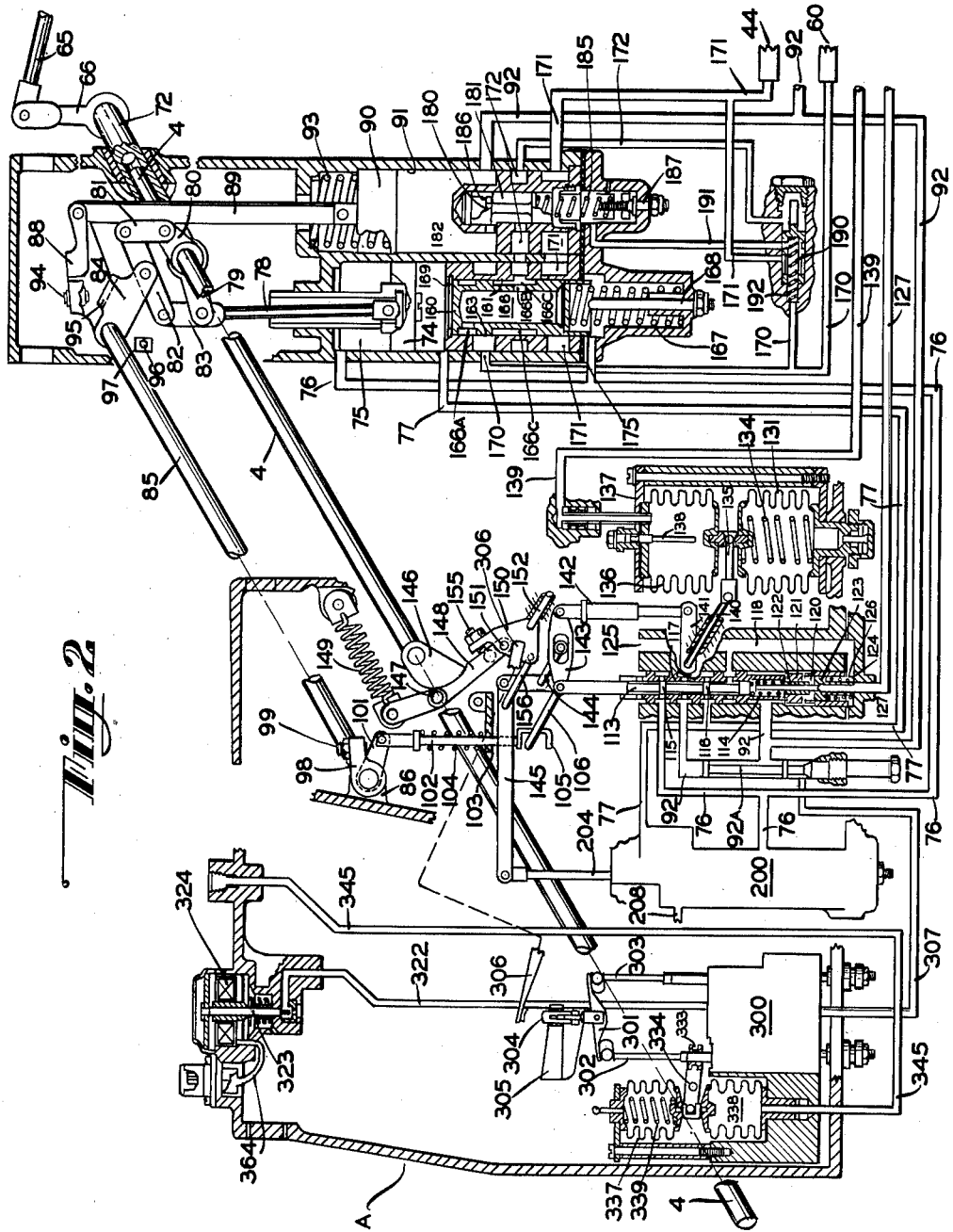

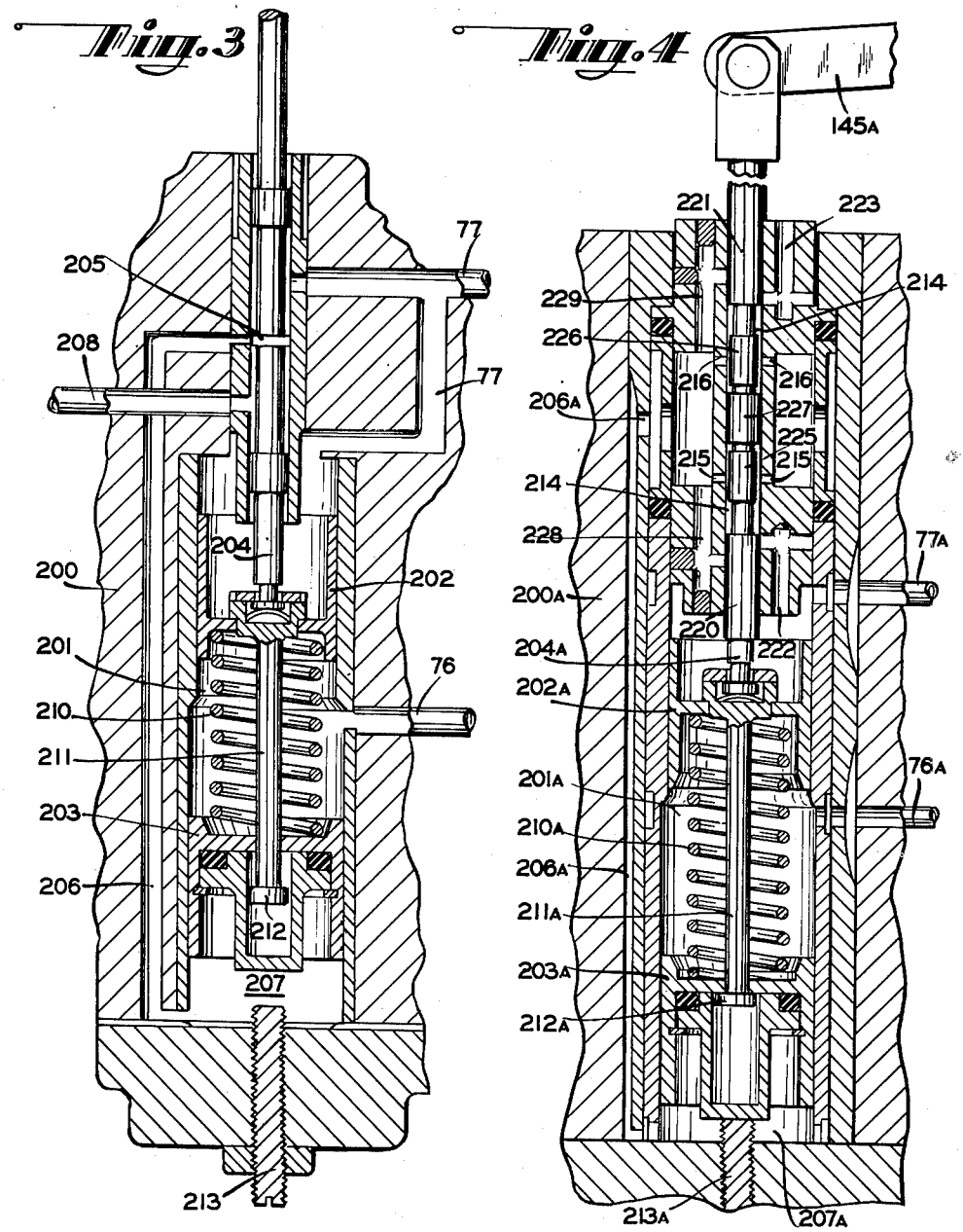

Jan. 29, 1952     H. A. ALEXANDERSON ET AL     2,583,537
ENGINE CONTROL
Filed June 6, 1947                                                  4 Sheets-Sheet 4
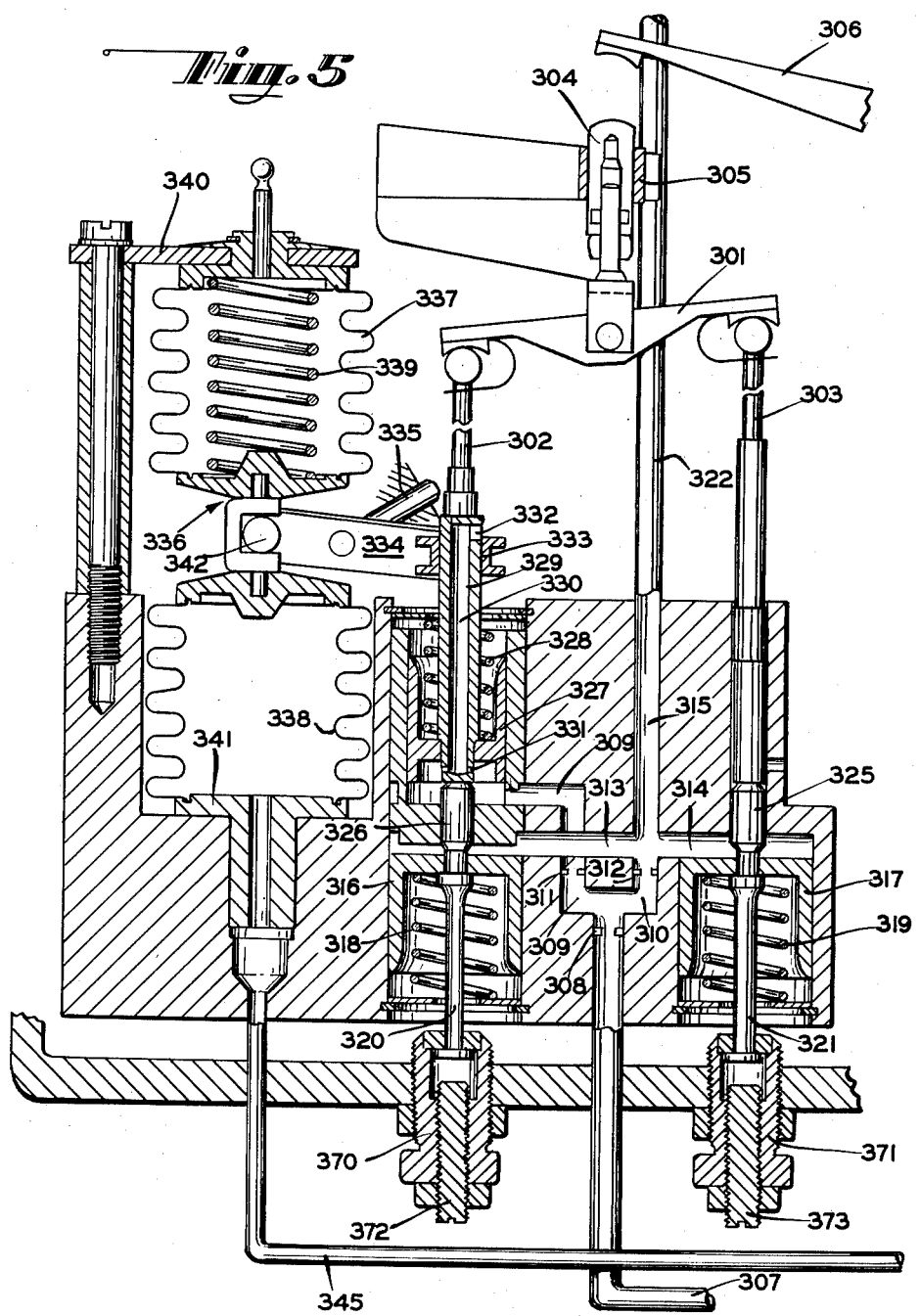
INVENTORS
HOWARD A. ALEXANDERSON
ARTHUR H. LE FEBVRE
BY *Herbert Townsend, Jr.*
ATTORNEY Patented Jan. 29, 1952

2,583,537

UNITED STATES PATENT OFFICE 2,583,537

ENGINE CONTROL

Howard Allan Alexanderson, Wood-Ridge, and Arthur Hibbard Le Febvre, Hackensack, N. J., assignors to Bendix Aviation Corporation, Teterboro, N. J., a corporation of Delaware Application June 6, 1947, Serial No. 752,912

18 Claims. (Cl. 121—41)

The present application relates to improvements in control mechanisms for power units of aircraft particularly of a type such as shown in the copending application Serial No. 596,472, filed May 29, 1945, by Howard A. Alexanderson and Robert Z. Hague.

An object of the invention is to provide novel means for effecting sequential control of a supercharger from a low speed hydraulic drive to a high speed hydraulic drive.

Another object of the invention is to provide a novel atmospheric pressure responsive means for limiting the maximum permissible pressure setting of the regulator in accordance with variations in altitude.

Another object of the invention is to provide a novel hydraulically operated means for controlling the intake manifold pressure of an aircraft engine.

Another object of the invention is to provide a novel reset follow-up arrangement for controlling a hydraulic variable speed drive. In the aforenoted copending application, the signal employed was the displacement of oil in the servo-decrease line from a flow metering valve. In the present invention the servo-increase to servo-decrease differential is used as the signal for operation of the follow-up piston. Any movement of the flow metering valve caused by a change in servo differential results in a proportional change in the position of the follow-up piston. Resetting involves the valving of servo-increase pressure to the underside of a reset piston which is larger in effective area than the follow-up piston. A follow-up piston spring acts between the two pistons so as to permit servo-increase pressure suitably valved by the follow-up valve, to move the reset piston and follow-up piston as a unit back to the position corresponding to the desired pressure setting.

Another object of the invention is to provide an improved power reset and altitude droop mechanism over that shown in the aforenoted copending application Serial No. 596,472.

Another object of the invention is to combine the functions of altitude droop and power reset so that they both limit the maximum permissible pressure setting through the action of a walking beam which links the same so as to stop a pressure selector linkage. Thus, when the pilot, through movement of a pilot's control lever, selects a pressure higher than the permissible valve, the selector system is stopped at the maximum value.

Another object of the invention is to provide a novel altitude bellows assembly. Changes in altitude pressure result in a movement of the bellows which is transmitted by a linkage to a positioning valve slidably mounted on the stem of an altitude droop piston and arranged to control ports in the stem for affecting the operation of the piston.

Another object of the invention is to so arrange the altitude droop, power reset, and reset follow-up as to jointly affect through the action of a walking beam the pressure setting of the mechanism.

Another object of the invention is to so arrange the reset follow-up mechanism that when the pilot is controlling the intake manifold pressure merely by throttle, rather than by the speed of the supercharger, the reset follow-up mechanism may be automatically cut out of operation.

Another object of the invention is to provide a novel reset follow-up valve and piston structure in which the piston stem serves as a control valve and operating member.

The above and other objects and features of the invention will appear more fully hereinafter from a consideration of the following description taken in connection with the accompanying drawings wherein two embodiments of the invention are illustrated by way of example.

In the drawings wherein like reference characters refer to like parts throughout the several views:

Figure 1 is a diagrammatic view of the novel hydraulic control system;

Figure 2 is a diagrammatic view of the control mechanism shown in Figure 1;

Figure 3 is an enlarged sectional view of one form of the reset follow-up mechanism;

Figure 4 is an enlarged sectional view of another form of the reset follow-up mechanism; and Figure 5 is an enlarged sectional view of the altitude droop and power reset mechanism.

Referring to Figure 1, there is provided in the present invention a main pilot's control lever 1, which is connected by a link 2 to an operative control lever 3. The control lever 3 is keyed to a main control shaft 4 shown in Figure 2 which extends into the main control unit or regulator indicated in Figure 1 by the letter A and shown diagrammatically in Figure 2 for controlling the setting thereof.

As shown in Figure 1, an engine 26 drives through a shaft 30 and a multi-speed hydraulic coupling 31, a supercharger 32.

The coupling 31 includes a gear 33 keyed to the shaft 30 and driving high speed coupling gear 34; low speed coupling gear 35 and an intermediate speed coupling gear not shown.

The high speed coupling gear 34 drives through a shaft 36 rotatably supported by a bearing 37 one set of blades of a hydraulic coupling 39 of conventional type. The opposite cooperating blades of the coupling 39 are fastened to a driven shaft 41 rotatably supported by a bearing 42. The shaft 41 has a fluid inlet passage 43 leading into the coupling 39 from a fluid conduit 44 controlled by a regulator A so as to vary the slippage of the coupling 39 as will be explained hereinafter. There is further provided in the casing of the fluid coupling 39 a fluid outlet port through which the hydraulic fluid may be returned from the coupling 39 to a suitable sump not shown.

Keyed to the driven shaft 41 is a high speed gear 45 which drives through a gear 46 the drive shaft 47 of the supercharger 32.

The low speed coupling gear 35 drives through a shaft 48 rotatably supported by a bearing 49 one set of blades of a hydraulic coupling 51 having a suitable fluid outlet port formed in the casing thereof. The opposite cooperating blades of the coupling 51 are fastened to a driven shaft 53 rotatably supported by a bearing 53A. The shaft 53 has a fluid inlet passage 54 leading into the coupling 51 from a fluid conduit 55 supplied with oil by a suitable engine driven pump so as to affect the slippage of the coupling. The latter passage is controlled by a valve positioned within the casing of the coupling 51 which may be of a type such as shown in Hobbs et al., U. S. Pat. No. 2,400,307, granted May 14, 1946, and arranged so that when the driven shaft 53 rotates at a speed greater than the driving shaft 48, the passage 54 is closed so as to permit the supercharger 32 to be driven through either the intermediate or the high speed coupling.

The intermediate speed gear, not shown, drives through a shaft 55 rotatably supported by a bearing 56 one set of blades of a hydraulic coupling 57 of a similar type to coupling 51. The opposite cooperating blades of the coupling 57 are fastened to a driven shaft 58 rotatably supported by a bearing 58A. The shaft 58 has a fluid inlet passage 59 leading into the coupling 57 from a fluid conduit 60 controlled by a regulator A so as to vary the slippage of the coupling, as will be explained hereinafter. The latter passage is also controlled by shut off valve positioned within the casing of the coupling 57 which may likewise be of a type such as shown in Hobbs et al. U. S. Pat. No. 2,400,307, granted May 14, 1946, and arranged so that when the driven shaft 42 rotates at a speed greater than the driving shaft 55, the passage 59 is closed so as to permit the supercharger 32 to be driven solely through the high speed coupling 39.

While the low speed and intermediate speed couplings 51 and 57, respectively, each include a shut off valve for the coupling fluid, as explained, the flow of fluid to the high speed coupling 39 is merely controlled by the regulator A.

In the engine system of Figure 1 controlled by the regulator A, there is provided a conduit 61 leading from an airscoop through a carburetor 62 into the air inlet for the supercharger 32. A conduit 63 leads from the air outlet of the supercharger 32 to the intake manifold of the engine 26. A throttle valve 64 controls the air inlet conduit 61.

The throttle valve 64 is controlled by a rod 65 operably connected, as shown in Figures 1 and 2, to a throttle control arm 66 of the regulator A.

The throttle control arm 66 is keyed to a shaft 72 rotatably mounted in a bearing formed in the casing of the control unit A. Rotatably mounted in the shaft 72 is one end of the shaft 4.

There is provided a servo piston 74 for operating the throttle 64 through shaft 72. The piston 74 is slidably mounted in a cylinder 75 having fluid pressure inlet passages 76 and 77 opening at opposite sides of the piston 74.

The piston 74 has a piston rod 78 pivotally connected at one end to the piston 74 and at the opposite end pivotally connected to an operating arm 79 formed integral with the rod 72.

Keyed to the pilot's control shaft 4 is a second arm 80 connected through a link 81 to one end of a walking beam 82. The opposite end of the walking beam 82 is connected through a link 83 to the arm 79.

Pivotally connected at a point intermediate the opposite ends of the walking beam 82 is one end of a lever arm 84 which is affixed at the opposite end to a shaft 85.

The shaft 85 is rotatably supported in suitable bearing portions 86 formed apart of the control unit A. Freely rotatable on the shaft 85 is an arm 88. The arm 88 is pivotally connected at the free end to a rod 89 which connects the arm 88 to a piston 90. The latter piston 90 is slidably mounted in a cylinder 91 into which opens at one end a passage 92 leading to a fluid pressure line such as oil under engine pressure. The piston 90 is normally forced under pressure of the oil in an upward direction as viewed in Figure 2.

A spring 93 is positioned between the piston and the upper end of the cylinder so as to force the piston in a downward direction upon oil pressure failure, whereupon the arm 88 is forced in a clockwise direction. An adjustable screw 94 projects through the arm 88 and is arranged so as to engage an abutment plate 95 on the arm 84 in the latter event so as to restrain movement of the arm 84 in a counter-clockwise direction. A stop pin 96 projects from a portion 97 of the casing of the unit A so as to restrain the arm 84 from movement in an opposite direction.

The pilot's control lever may then effect manual control of the throttle valve 64 through shaft 4, arm 80, link 81, walking beam 82, link 83, arm 79 and throttle control shaft 72.

The adjustable screw 94 is preferably adjusted so as to permit a small amount of angular travel of lever 84 between screw 94 and stop pin 96. During such manual operation of the throttle 64, lever arm 84 is driven between its restraining stops 94 and 96 rotating shaft 85.

At the opposite end of the shaft 85 there is affixed an arm 98 through which projects an adjustable screw 99. The screw 99 is arranged to engage an arm 101 supported on shaft 85. The arm 101 is freely rotatable on the shaft 85 and has coupled thereto a push rod 102 which is slidably mounted in a bracket 103. The bracket 103, riveted to the inner wall of the unit A, guides the push rod 102 and supports a coil spring 104 against which the push rod reacts. The spring 104 biases the push rod 102 in an upward direction and the arm 101 in a counter-clockwise direction into engagement with the set screw 99. There is affixed at the lower end of the push rod 102, a hook-like actuating element 105, which is arranged to cooperate with a pin 106 projecting from the head of a valve stem 113, as described and claimed in the copending application Serial No. 709,923 of Charles E. Cole, filed November 15, 1946, and now U. S. Patent No. 2,444,185, granted June 29, 1948, and assigned to Bendix Aviation Corporation.

The valve stem 113 is biased under force of a spring 114 in an upward direction. The valve stem 113 has valve members 115 and 116 arranged so as to control passages 76 and 77 respectively opening into valve chamber 117 and leading to chamber 75 at opposite sides of piston 74 so as to control the movement of the piston 74. The fluid pressure line 92 leads through an oil filter 92A to a point intermediate the openings of passages 76 and 77 to valve chamber 117. A fluid medium outlet or drain passage 118 also opens from the valve chamber 107 at the lower side of valve 116.

Another valve chamber 120 is provided separated from the valve chamber 117 by a sealing member 121. Projecting through the sealing member 121 is a valve stem 122. At the lower end of the valve stem 122 is mounted a cylindrical valve 123 having a spring 124 which tends to bias the valve 123 and stem 122 in an upward direction.

The fluid pressure passage 92 opens into the valve chamber 120 at the upper side of the valve 123 so that during normal operation the fluid pressure medium forces the valve 123 downward into the position shown in Figure 2. The exhaust passage 118 has a port 125 opening into the housing of the control unit A and a port 126 opening into the chamber 110 but closed by the valve 123 when biased downward to the position shown in Figure 2. A main drain passage 127 opens into the valve chamber 110. During normal operation, the fluid medium is drained from the housing by suitable ports not shown.

When no pressure medium is available, or upon oil pressure failure, the drain valve 123, which is loaded by spring 124, is moved in an upward direction under force of the spring 124 serving two purposes. It causes the oil in the housing of the control unit A to drain to a predetermined low level by uncovering drain port 126 so as to permit such drainage through port 125, passage 118, port 126, valve chamber 120, and through passage 127 to the fluid outlet. Secondly the spring 124 urges valve stem 122 upward into contacting relation with the lower end of the valve stem 113, so as to actuate the valve stem 113 in an upward direction.

During such fluid pressure failure, movement of the pilot's control lever 1 so as to move arm 80 in a counter-clockwise direction causes movement in a counter-clockwise direction of the lever arm 84 between its restraining stops 96 and 94 whereupon valve stem 122 under force of spring 123 causes servo valve 113 to move from its neutral position, as shown in Figure 2, to an upper position so as to uncover the ports leading to passages 76 and 77 so as to permit movement of the throttle 64 manually. Similarly, upon movement of the lever arm 84 in a clockwise direction between its restraining stops 94 and 96 as upon manual movement of arm 80 in a clockwise direction, lever arm 101 actuates through plunger 102 the valve stem 113 in a downward direction opening the ports to passages 76 and 77. It will be seen from the foregoing that the manual operation of the servo valve 113 not only permits the opening of the passage 76 and 77 so that the manual operation of arm 79 and accordingly throttle 64 may be effected, but in the event slight pressure be available, such movement of the valve 113 directs such slight pressure so as to effect piston 74 so as to assist the manual movement of the arm 79 and thereby assist in the manual control of throttle valve 64.

*Automatic control of throttle*

When fluid pressure is available in excess of a predetermined value, the piston 90 is moved upward under the pressure medium from passage 92 against the force of spring 93. This latter action forces link 89 upward moving lever 88 in a counter-clockwise direction so as to permit lever arm 84 to move free of the restraining screw 94. Likewise, upon such fluid pressure medium becoming effective, the valve 123 is moved downward against spring 124 permitting the servo valve 113 to move free of the valve stem 122 under automatic control.

In order to effect the latter automatic control, there is provided a pressure responsive bellows assembly including an evacuated bellows 131 supported at one end by the inner wall of the control unit A.

A spring 134 is positioned within the evacuated bellows 131 tending to expand the same. At the opposite end of the bellows 131 there is provided a movable arm 135 interposed between the bellows 131 and a second bellows 136. The bellows 136 is mounted at the opposite end by a fixed plate 137 fastened to the control unit A. An adjustable pin 138 projects into the bellows 136 from the portion 137 so as to limit the extent of contraction of the bellows 136 for a purpose which will be described hereinafter.

A passage 139 formed in the control unit A leads from the interior of the bellows 136 to the air intake manifold conduit 58 as shown in Figure 1. Thus, the bellows 136 is controlled by the intake manifold pressure of the engine 26.

As shown in Figure 2, the movable arm 135 between the manifold pressure bellows 136 and evacuated bellows 131 is connected through a pivot pin 140, link 141, resilient link assembly 142, and beam 143 to the servo valve 113. The resilient link assembly may be of the type described in the copending application Serial No. 709,923, filed November 15, 1946, by Charles E. Cole, and is arranged so as to permit deflection of the servo valve 113 by the actuating element 105 and valve stem 122 without excessively loading the bellows assembly.

The selected pressure or datum of the bellows assembly may be changed by moving a pin 144 on which beam 143 is pivotally supported. Pin 144 is linked to one end of a whiffle-tree type of beam 145 controlled through operation of a pressure selecting mechanism, a hydraulic follow-up mechanism, and an altitude droop mechanism as will be described hereinafter.

It will be readily seen, however, from the foregoing, that upon an increase in the intake manifold pressure above the selected pressure there will result an expansion of the manifold pressure bellows 136 causing the beam 143 to be shifted in a clockwise direction whereupon the servo valve 113 will be adjusted upward causing a pressure medium to be applied through the passage 76 to the upper side of the piston 74 and exhausting the lower side through passage 77. This action will cause the piston 74 to be adjusted downward so as to adjust the arm 79 in a counter-clockwise direction so as to adjust the arm 61 in a counter-clockwise direction moving valve 64 of Figure 2 through rod 65 in a valve closing direction decreasing the intake manifold pressure until the valve 113 is returned to a neutral position. An opposite effect is, of course, produced upon the intake manifold pressure dropping below the selected valve.

Pressure selecting mechanism

A pressure selector cam 146 is rigidly keyed to a pilot's control shaft 4. Contacting the contour of the selector cam 146 is a cam follower 147 projecting from a follower lever 148 is loaded by an extension spring 149 and pivotally mounted on a selector plate 150 at pin 151. The selector plate 150 is pivoted on a pin 152 which projects from the inner wall of the control unit A.

An adjusting screw 155 is mounted on the selector plate 150 and limits the clockwise rotation of lever 148. The selector plate 150 pivoted on the pin 152 transfers adjustment thereof to the whiffle-tree 145 through an interconnecting pin 156 projecting from the plate 150 and upon which the whiffle-tree beam 145 is pivotally mounted. It will be readily seen from the foregoing that with spring 149 pivoting lever 148 at follower 147 in a clockwise direction into contacting relation with adjustment screw 155, the follower 147 and selector plate 150 act as a unit, and the pressure selection of cam 146 is transmitted to the bellows and valve linkage through pin 156, beam 145 and pin 144.

The manifold pressure bellows 136 is provided with the adjustable lock out stop pin 138 previously described. The latter pin 135 may be adjusted to a low manifold pressure value below the minimum idling pressure for the engine 26, but above the minimum selected pressure. Thus, as pressures are selected by the pilot through operation of the control lever 1 which are less than the lockout setting pressure, the control unit A may be locked into manual operation through the joint effect of the pin 138 and 144 causing the adjustment of the valve 113 upward tending to adjust the throttle valve 64 to a closed position. Through appropriate manual adjustment of the control lever 1 and a direct follow-up action of rod 102, the throttle 64 may be manually controlled as set forth in the copending application Serial No. 709,923, filed November 15, 1946, by Charles E. Cole and now U. S. Patent No. 2,444,185, granted June 29, 1948, and assigned to Bendix Aviation Corporation. The lockout stop 138 also permits closing of the throttle 64 in the event of a broken evacuated bellows, since it provides means for placing the control unit into manual operation. The aforenoted lockout feature is described and claimed in the copending application Serial No. 550,646, filed August 22, 1944, by Howard A. Alexanderson and now U. S. Patent No. 2,453,650, granted November 9, 1948, and assigned to Bendix Aviation Corporation.

Supercharger speed control

As the valve 113 is adjusted by the bellows assembly from its neutral position, there is effected a corresponding adjustment of the piston 74. As the bellows calls for greater pressure, the piston 74 is adjusted upward until the throttle 64 has been adjusted to the fully open position. Piston 74 is of such a size that the same effectively overcomes all throttle loads at a predetermined fluid or oil pressure differential of, for example, 20 p. s. i. When the piston 74 has opened the throttle 64 fully, if the manifold pressure still remains less than the setting, the fluid pressure differential from passage 77 to 76 will rise above the predetermined pressure value.

A metering piston-valve 160 is provided slidably mounted in a piston chamber 161 opening at one end into the chamber 75 and so arranged that the fluid pressure medium applied to the piston 74 through passage 77 may be also applied to one side of the piston head 160. The piston valve 160 includes the valve members 163 and 164. A passage 166 extends through the valve 160 and opens at opposite sides at 166A and 166B. The opening 166B opens into a channel 166C of the valve 160. A spring 167 biases the piston-valve assembly 160 upward. An adjustable pin 168 projects upward from the valve casing and limits movement of the piston valve 160 in a downward direction, while a ring 169 limits movement of the piston valve 160 in an upward direction.

The valve members 163 and 164 are arranged to open in sequence passages 170 and 171 to pressure medium supplied the valve 160 through pressure conduit 172 as the pressure supplied at one end of piston valve 160 through passage 77 exceeds predetermined differential values above the pressure supplied the opposite end of the valve 160 through passage 175, which opens from the line 76.

The passage 170 opens into the conduit 60 which, as shown in Figure 1, supplies fluid medium to the intermediate speed coupling 57 through passage 59 and suitable shut off valve not shown. Similarly, the passage 171 opens into the conduit 44 so as to supply fluid medium to the high speed coupling 39 through passage 43.

The hydraulic couplings 57 and 39 serve to couple the driving member 30 to the driven member 47 at varying speed ratios depending upon the rate of fluid flow supplied to the individual coupling which thus determines the slippage of the coupling and its speed ratio.

The metering piston-valve 160 is adjustably positioned by the aforenoted differential pressure so as to properly control the coupling ratio and accordingly the driving speed of the supercharger 32 so as to maintain a preselected intake manifold pressure in the conduit 63 as controlled by the servo-valve 113.

In order to provide a substantially constant pressure in the passage 172, there is provided a reducing valve 180 including a valve chamber 181 having a pressure inlet passage 182 leading from the piston chamber 91 and an opening in the chamber 181 leading to the passage 172. A spring 185 biases the valve 180 in an upward direction tending to counterbalance the pressure applied at the upper end of valve 180 through a passage 186, while a portion of the valve 180 tends to open the passage 182 to the pressure medium as the valve 180 is biased upward by the spring 185 so as to increase the pressure applied through passage 172 to a predetermined constant value. The tension of spring 185 may be adjusted by means of a suitable adjusting mechanism 187 so as to vary the maximum flow through passage 172.

It has been found, however, that there is considerable variation in the back pressure in lines 170 and 171, thereby causing a metering error. In order to correct this condition, a shuttle valve 190 has been provided to connect through conduit 191 the pressure in the passage 170 of the intermediate speed coupling 57 to the lower end of the valve member 180 during intermediate speed supercharger operation and the pressure in the passage 171 to the lower end of the valve member 180 during high speed supercharger operation. As back pressure increases the valve 180 will tend to increase the opening of the passage 182 so as to compensate for such increase.

It will be seen that in low speed, and intermediate speed coupling operation, the back pressure applied through line 172 will be relatively great tending to bias the shuttle valve 190 to the left, as viewed in Figure 2, and connecting line 170 through a suitable valve port to conduit 191. However, upon the valve 160 moving downwardly sufficiently so that channel 166C coincides with port 171, the back pressure in line 172 decreases sufficiently so that shuttle valve 190 is biased under force of spring 192 to the right closing conduit 170 to conduit 191 and connecting conduit 171 to conduit 191 through a suitable channel formed in the shuttle valve 190.

Conversely, when the pressure in passage 172 exceeds a predetermined value, as upon valve 160 closing passage 171, the valve 190 is shifted to the left so as to shift the reference pressure for the reducing valve 180 from that in passage 171 to the pressure in passage 170.

The foregoing structure is described and claimed in the copending application Serial No. 596,472, filed May 29, 1945, by Howard A. Alexanderson and Robert Z. Hague.

The present application relates to novel features which will be described hereinafter.

*Follow-up mechanism*

When valve 160 is moved from one position to another, there is an elapse of time required to flow the fluid medium into the hydraulic coupling 39 or 57 to bring the coupling to the particular slip condition required, and for the supercharger to cause the intake manifold pressure to rise to the selected value. This time lag tends towards instability and in order to provide a stabilizing action, a novel follow-up mechanism 200 has been provided.

The principle of reset follow-up stabilization of a variable speed drive was originally employed in the earlier disclosure of the application Serial No. 596,472 referred to above. In the previous form of reset follow-up, the signal employed was the displacement of oil in the servo-decrease line corresponding to line 76 leading from the flow metering valve 113. In the control of the present application the servo-increase line 77 to servo-decrease line 76 differential is used as the signal for operation of the follow-up mechanism 200 which may be of a form such as shown in detail in Figure 3 or 4.

The structure of the reset follow-up mechanism 200 permits servo-increase pressure to be suitably valved by a follow-up valve so as to move a reset piston and follow-up piston as a unit back to a position corresponding to the desired manifold pressure setting. The pressure applied to the underside of the reset piston is vented to drain when a decrease in servo differential causes the follow-up piston to move upward in order to obtain an effect in reverse to that described above.

As shown in Figure 3, the reset follow-up mechanism comprises a valve chamber 201 in which are slidably mounted a follow-up piston 202 and a reset piston 203. The follow-up piston 202 is connected to one end of a valve rod 204 which in turn is connected at the opposite end to an end of the whiffle-tree type of beam 145 to provide a follow-up action to the metering valve 113.

Opening into the valve chamber 201 at the lower side of follow-up piston 202 is the servo-decrease pressure line 76, while the upper side of the follow-up piston 202 is subject to the servo-increase pressure line 77.

The valve rod 204 has a valve portion 205 which controls a passage 206 leading to a chamber 207 at the lower side of the reset piston 203. The upper side of the reset piston 203 is subject to the pressure in line 76.

Opening at the lower side of the valve portion 205 is a drain passage 208, while opening at the upper side of the valve portion 205 is the servo pressure increase line 77.

The follow-up piston 202 has a smaller diameter or surface area than the reset piston 203. The follow-up piston 202 and reset piston 203 are interconnected by a resilient spring member 210. There is also provided a stop rod 211 having a portion 212 to limit the extent of movement of one piston relative to the other as will be explained.

An adjustable screw 213 limits the downward movement of the reset piston 203.

In operation it will be seen that upon the bellows 136 calling for an increase in the speed of supercharger 32 as upon a decrease in the intake manifold pressure, the valve 113 will be adjusted downward increasing the pressure in line 77 and causing follow-up piston 202 to move downward, whereupon the beam 145 will pivot about the pin 156 in a counter-clockwise direction raising the valve 113 in a follow-up action.

Likewise, the downward movement of valve rod 204 will cause valve 205 to open passage 206 to the pressure line 77 causing reset piston 203 to move upward so as to increase the tension of spring 210 and thereby tend to return piston 202 and valve 205 to a neutral position. The latter action likewise resets the beam 145 and the setting of the valve 113 to its normal position relative to bellows 136.

Upon bellows 136 calling for a decrease in the supercharger speed as upon a rise in the intake manifold pressure, the valve 113 will be adjusted upward causing a pressure increase in the line 76, whereupon piston 202 will move upward causing valve 205 to open passage 206 to drain 208 and moving beam 145 in a clockwise direction so as to lower valve 113 in a follow-up action. The upward movement of valve 205 will moreover decrease the pressure applied at 207 to cause a reset of piston 203, decreasing the tension applied by spring 210 to piston 202, whereupon piston 202 will be reset downward to a neutral position.

A further feature of the reset follow-up arrangement is the mechanical interconnection of the follow-up piston 202 and reset piston 203. During operation of the throttle piston 74, the condition of positive differential of the servo pressure line 77 minus servo-decrease pressure line 76, becomes a negative differential, when the pressure of line 76 exceeds that of line 77 in operating the piston 74 between extreme adjusted positions thereof. Under this condition the pressure in line 76 acting on the piston 202 and 203 tends to cause the same to separate, whereupon valve 205 opens chamber 207 to drain. The latter movement of piston 202 in an upward direction is limited by the portion 212 of the stop rod 211 which then mechanically connects the two pistons together.

As the piston 203 has a greater surface area than the piston 202, the pressure acting on piston 203 draws the piston 202 downward with it to a point limited by an adjustable screw 2 _ which is arranged to stop the piston 203, at a position such that the valve 205 closes passage 206 and rod 204 is held at a neutral position relative to the beam 145 during throttle operation.

A second form of the follow-up reset mechanism is shown in Figure 4 in which like numerals with the addition of the letter A indicate corresponding ports to those described with reference to Figure 3 and in which the pistons 202A and 203A are shown in the lock out position assumed during throttle operation.

In the latter form of the invention, there is provided an improved reset control valve arrangement in which valve rod 204A is slidably mounted in a valve chamber 214 having pressure ports 215 opening through suitable passages to passage 206A leading to reset piston chamber 207A and drain ports 216 likewise opening to passage 206A.

The valve rod 204A has provided valve members 220 and 221 which serve to control the opening of a pressure passage 222 and a drain passage 223 respectively to the valve chamber 214. The pressure passage 222 opens to the upper end of the follow-up piston 202A and thereby to the servo-increase pressure passage 77A, while the drain passage 223 opens to the interior of the unit A from which it is drained by suitable means not shown.

The valve rod 204A has further provided a metering land 225 which is spaced from the inner wall of the valve chamber 214 and arranged so as to effect a relatively slow rate of flow to the reset chamber 207A through valve chamber 214 upon relatively slight movement of valve member 220 in a direction opening pressure port 222.

The valve rod 204A has also provided a second metering land 226 which is also spaced from the inner wall of the valve chamber 214 and likewise arranged so as to effect a relatively slow rate of flow from the reset chamber 207A through valve chamber 214 upon relatively slight movement of valve member 220 in a direction opening drain port 223. Also affixed to the rod 204A and slidably mounted in the valve chamber 214 is a land 227 positioned in sealing relation in the valve chamber 214 and intermediate the metering lands 225 and 226 so as to separate the pressure and drain passages in the valve chamber 214.

Thus, the metering lands 225 and 226 provide a convenient means for controlling the rate of flow to and from the reset chamber 207A.

There is further provided a pressure by-pass passage 228 which opens at one end to passage 206A, while the opposite end thereof is arranged so as to be connected to passage 222 by valve 220 opening passage 228 upon an extreme increase in the pressure effecting line 77 or differential across lines 77 and 76. Thus, chamber 207A may be connected directly through passage 228 to the source of pressure without being subject to the metering action of land 225 upon such extreme change.

There is also provided a by-pass drain passage 229 which opens at one end to passage 206A, while the opposite end thereof is arranged so as to be connected to passage 223 by valve member 221 opening passage 229 upon an extreme decrease in the pressure effecting line 77 or the differential across lines 77 and 76. Thus, chamber 207A may be connected directly through passage 229 to drain without being subject to the metering action of land 226 upon such extreme change.

The foregoing feature thus varies the time of resetting with operating conditions so as to tend towards a more stable control.

It will be seen then that during operation when only partial movement of the follow-up piston 202A is effected the operating liquid will pass through the clearance provided by the metering land 226 or 225 so as to cause the reset piston 203A to return the follow-up piston 202A relatively slowly to a neutral position through action of spring 210A.

However, when a great increase in the intake manifold pressure is required, the metering valve 160 will be subjected to a high pressure differential across lines 76 and 77 by the servo valve 113, thus causing the metering valve 160 to move downward rapidly and the follow-up piston 202A likewise to move downward to its full extent. The latter action will open by-pass passage 228 so as to cause the reset piston 203A to return the follow-up piston 202A toward a neutral position rapidly and permit the pressure medium to be valved into the coupling passages 170 or 171, respectively, to provide acceleration of the couplings 39 and 57 without the retarding effect of the follow-up action.

The follow-up action of the piston 202A is transmitted by rod 204A to the selector whiffletree beam 145A. Thus, upon the pressure differential across lines 76 and 77 increasing and causing the metering valve 160 to move downward to increase the manifold pressure, the follow-up piston 202A moves downward causing the whiffletree selector beam 145A to move in a counterclockwise direction about the pin 156 so as to decrease the pressure setting. Likewise, upon the pressure differential across lines 76 and 77 increasing, causing the metering valve 160 to move in an upward direction to decrease the manifold pressure, the follow-up lever is moved so as to increase the pressure setting and thereby providing a novel follow-up action for preventing instability of the control unit A. However, upon a relatively great change in the intake manifold pressure being required, the reset piston 203A is so controlled as to rapidly cut out of operation the latter follow-up action of piston 202A as explained.

*Altitude droop and power reset*

In the subject control, the functions of altitude droop and power reset for water injection operation have been combined in a mechanism 300 so that both limit the maximum permissible intake manifold pressure.

As shown in Figure 2, a walking beam 301 links an altitude droop plunger 302 and a power reset plunger 303 to a push rod 304 slidably mounted in a bracket 305 affixed to the inner surface of the unit A. The push rod 304 is arranged so as to limit the movement of an arm 306 which, as shown by dotted lines in Figure 2, is affixed to the selector plate 150 so as to limit the adjustment of the manifold pressure selector linkage. Thus, when the pilot, through movement of the pilot's control lever 1, selects a pressure higher than the permissible value, the push rod 304 engages the arm 306 and further adjustment of the selector plate 150 in a pressure increasing direction is thereby prevented, the selector system is stopped at the maximum permissible value and the selector cam 146 causes lever 148 to disengage the screw 155 of the selector plate 150 against the tension of spring 149.

The structure of the mechanism 300 is shown in greater detail in Figure 5 in which operating liquid is supplied through a conduit 307 under pressure from the filter 92A.

The pressure conduit 307 has a restriction 308 and two branch passages 309 and 310 in which are like restrictions 311 and 312 respectively. Three passages 313, 314 and 315 open from the passage 310 at the opposite side of the restriction 312 from passage 307. The passage 313 leads to the upper side of a piston 316, while the passage 314 leads to the upper side of a piston 317.

A spring 318 biases the piston 316 upward in opposition to the pressure in line 313 while a spring 319 biases the piston 317 upward in opposition to the pressure in line 314. A stop rod 320 limits the movement of piston 316 under the force of the spring 318 while stop rod 321 limits the movement of piston 317 under the force of spring 319.

The stop rod 321 includes an actuating rod portion 325 which engages the inner end of the power reset plunger 303 and thereby limits its movement, while the stop rod 320 includes an actuating rod portion 326 which limits the downward movement of a servo piston 327.

The passage 315, as shown in Figure 2, is connected to a conduit 322 which leads to a valve 323 operated by a solenoid 324 and arranged upon deenergization of the solenoid to open the end of the conduit 322 so as to permit the pressure fluid from line 315 to drain to the interior of the unit A from which it is suitably drained.

Upon energization of the solenoid 324, the valve 323 is operated so as to close the end of conduit 322 and permit pressure to build up in the conduits 313 and 314 forcing the pistons 316 and 317 downward against the biasing force of springs 318 and 319 respectively.

The servo-piston 327 has, acting at the underside thereof, pressure from the line 309, while a spring 328 biases the piston 327 downward in opposition to the pressure from line 309.

Affixed to the piston 327 is a hollow stem portion 329 having a passage 330 extending longitudinally therein. One end of the passage 330 opens through ports 331 to the pressure passage 309, while the opposite end of the stem 329 opens through a port 332 to the interior of the unit A from which the exhausted servo fluid may be suitably drained.

Slidably mounted on the stem 329 and controlling the port 332 is a valve 333 affixed to one end of an arm 334. The arm is pivoted on a pin 335 while the opposite end is connected to an altitude bellows assembly 336. The bellows assembly consists of two opposed bellows 337 and 338, the bellows 337 being evacuated and having a spring 339, while the other bellows 338 is subjected to the pressure to be measured. One end of bellows 337 is fixedly mounted by a bracket 340 while the end of the bellows 338 is fixedly mounted at 341. The opposite ends of the bellows 337 and 338 bear upon a roller member 342 affixed to the arm 334 so as to adjustably position the same.

A conduit 345 connects the interior of the bellows 338 to the pressure at conduit 61 as shown in Figure 1.

It will be seen that changes in altitude pressure will result in a movement of the bellows 338 which is transmitted by the arm 334 so as to vary the position of valve 333. This valve 333 controls the port 332 in the stem 329 of the altitude droop piston 327 assembly.

Operating liquid under pressure, after passing through restrictions 308 and 311, is fed to the underside of the altitude droop piston 327 to oppose the action of a spring 328 which acts on top of the piston 327. Thus, upon a decrease in atmospheric pressure, as upon a rise in altitude, bellows 338 contracts causing the valve 333 to further restrict port 332, whereupon the fluid pressure applied to piston 327 is increased, moving the piston 327 together with plunger 302 and push rod 304 upward further limiting the permissible pressure. Of course, upon an increase in atmospheric pressure, an opposite result is effected.

The action of the assembly 300 is to reduce the maximum permissible intake manifold pressure setting during a decrease in atmospheric pressure (increase in altitude).

The spring loaded piston 316 acting in parallel with the power reset piston 317 is employed as an altitude stop piston. This piston stops the movement of the altitude droop piston 327 through action of member 326 so as to provide a maximum intake manifold pressure setting during operation of a fluid injection system which is considerably greater than during non-operation of the fluid injection system.

As best shown in Figure 1, the latter fluid injection system includes a conduit 350 leading from a suitable source of fluid fuel to the carburetor 62 and a conduit 351 for injecting the fuel into the induction system through a nozzle 352. There is further provided a conduit 353 for injecting into the induction system through nozzle 352 a supplemental or so-called "anti-knock" fluid medium such as water, water alcohol, or other suitable fluid well known in the art for suppressing predetonation of the engine 26.

The conduit 353 is connected to a suitable metering device shown in dotted outline and indicated generally by the numeral 354. The latter metering device may be of a suitable type well known in the art for determining the rate of flow of the "supplemental" fluid.

A conduit 355 leads to the metering device 354 from a suitable source of "supplemental" fluid indicated by numeral 356. In the conduit 355, there is provided a pump indicated by numeral 357 driven by a suitable power means not shown. The pump 357 supplies the fluid medium under pressure to the metering device 354.

A valve 358 is provided in the conduit 355 between the pump and metering device 354 for "off" and "on" control of the "supplemental" fluid injection system. The control valve 358 may be of any suitable type, but is shown herein as of an electromagnet controlled type having an electrical control circuit 359 and switch 360 which is preferably mounted within the aircraft cabin for convenient operation by the pilot.

Thus, the supplemental fluid injection system may be placed in operation by the pilot closing the switch 360 so as to effect the opening of the valve 358. Conversely, the valve 358 may be closed by opening the switch 360.

A by-pass conduit 361 and relief valve 362 is provided for recirculating the fluid medium from the pump outlet to the pump inlet at such times as the valve 358 is closed and the injection system is not in operation.

A pressure switch 363 of suitable type well known in the art is further connected in conduit 355 between valve 358 and the metering device 354. The pressure switch 363 is arranged to respond to the pressure of the fluid injection system so as to close a circuit 364 for energizing the electromagnet 324 upon operation of the fluid injection system.

It will be readily seen then that upon operation of the fluid injection system, the fluid under pressure will close the pressure switch 363, whereupon valve 331 will close the open end of passage 322 causing pistons 316 and 317 to be biased downwardly against the biasing force of the springs 318 and 319, respectively, so as to thereby increase the maximum permissible intake manifold pressure setting. Moreover, upon operation of the fluid injection system being terminated, the pressure switch 363 will open the circuit for energizing the electromagnet 324, whereupon valve 323 will open conduit 322 permitting the pistons 316 and 317 to resume the normal position shown under force of springs 318 and 319 respectively.

Adjustable screw 370 is arranged to limit the upward movement of stop rod 320 and thereby piston 316, while adjustable screw 371 limits the upward movement of stop rod 321 and thereby piston 317. By appropriate adjustment of the screws 370 and 371, the maximum permissible intake manifold pressure setting for non-operation of the fluid injection system may be conveniently adjusted.

Adjustable screw 372 is arranged to limit the downward movement of stop rod 320 and thereby piston 316, while adjustable screw 373 limits the downward movement of stop rod 321 and thereby piston 317. By appropriate adjustment of the screws 372 and 373, the maximum permissible intake manifold pressure setting for operation of the fluid injection system may likewise be conveniently adjusted.

Operation

It will be seen from the foregoing that there is provided a novel hydraulically operated control unit in which movement of the main control lever 1 operates a cam 146 so as to set the pressure controlling element 143 to the desired intake manifold pressure.

In the automatic operating range of the unit A (above the idling pressure range determined by bellows stem 138) the throttle opening will not be sufficient to provide the manifold pressure selected. Consequently, the throttle actuating servo 74 automatically opens the throttle 64 further to give the selected pressure. At a given position of the main control lever 1, the intake manifold pressure will be kept constant.

The engine control unit A is further arranged to control the operation of a variable speed supercharger drive 31 upon the throttle being adjusted to a maximum open position.

The drive 31 includes high, intermediate and low speed hydraulic drives 39, 57 and 51, respectively. This is accomplished through operation of a flow control valve 160. The low speed coupling 51 is supplied with coupling fluid through a conduit 55 leading from an engine driven pump and the supercharger 32 is normally driven through the low speed coupling during operation of the throttle 64.

However, when the throttle 64 reaches the wide open position, the flow control valve 160 is adjusted by increased hydraulic pressure so as to cause coupling fluid to flow through conduit 170 and line 60 to the intermediate speed coupling 57.

Upon the supercharger 32 being driven through the coupling 57 at a speed greater than that of low speed coupling 51, a shut off valve, of a type well known in the art, closes passage 54 and permits low speed coupling 51 to empty.

If a further increase in the speed of the supercharger 32 is required, then the flow control valve 160 is further adjusted by increased hydraulic pressure to cause coupling fluid to flow through conduit 171 and 44 to the high speed coupling 39.

Similarly, upon the supercharger 32 being driven through the coupling 39 at a speed greater than that of the intermediate speed coupling 57, a shut off valve, not shown, but of a type well known in the art, closes passage 59 and permits the intermediate speed coupling 57 to empty.

A novel reset follow-up mechanism 200 is provided arranged so as to be affected by the same differential pressure which acts upon the metering valve 160 so as to provide a follow-up action on the servo control valve 113 to provide greater stability of control. The mechanism 200 includes a follow-up piston 202 and a reset piston 203 controlled thereby for returning the follow-up piston 202 to a neutral position and arranged to cut the follow-up piston 202 out of operation during normal throttle control.

The control unit A is further provided with a novel device 300 for limiting the maximum permissible selected intake manifold pressure in accordance with the prevailing atmospheric pressure or altitude and further providing means whereby a different limit is provided during operation of a supplemental fluid injection system than during inoperation of the system.

Although only two embodiments of the invention have been illustrated and described, various changes in the form and relative arrangements of the parts may be made to suit requirements.

What is claimed is:

1. A reset follow-up mechanism comprising, in combination, a follow-up fluid motor having a piston, a reset fluid motor having a piston, an actuating rod carried by the follow-up piston, valve means mounted on the actuating rod for controlling the reset piston, and resilient means between the reset and follow-up pistons for adjustment by the reset piston to return the follow-up piston to a neutral position.

2. The combination defined by claim 1 in which said valve means include a pair of control valve members and a pair of metering lands controlling the flow of pressure fluid to and from said third passage, and additional passages controlled by said valve members for by-passing said metering lands upon a relatively great change in the position of said follow-up piston.

3. The combination defined by claim 1 in which there is provided means forming a chamber in which said reset and follow-up pistons are slidably positioned in longitudinal alignment, said reset piston having a greater surface area than said follow-up piston, pressure conduits opening at opposite sides of said follow-up piston for differentially affecting said follow-up piston, one of said pressure conduits opening to one side of said reset piston, a drain conduit, and said valve means selectively controlling the opening of said drain conduit and said other conduit to the other side of said reset piston.

4. The combination defined by claim 3 in which there is provided a stop rod for limiting the movement of one piston relative to the other and to mechanically connect the reset piston to the follow-up piston so as to return the follow-up piston and said valve means to a neutral position upon the pressure applied through said one pressure conduit exceeding that in the other conduit.

5. A rest follow-up mechanism comprising, in combination, a housing having a longitudinally extending chamber formed therein, a follow-up piston slidably mounted in said chamber, a reset piston slidably mounted in said chamber and aligned with said follow-up piston, an actuating rod extending from one end of said follow-up piston, a stop rod extending from the other end of said follow-up piston and arranged to engage said reset piston, a helical spring surrounding said stop rod and operably connecting said reset piston to said follow-up piston, said housing having a first fluid pressure inlet passage opening into said chamber between the follow-up and reset pistons, said first fluid pressure tending to bias said pistons in opposite directions, said reset piston having a greater surface area exposed to said first fluid pressure than said follow-up piston, a second fluid pressure inlet passage opening at the opposite end of said follow-up piston and opposing the force on said follow-up piston of said first fluid pressure, an inlet passage opening at the opposite end of said reset piston and opposing the force on said reset piston of said first fluid pressure, a drain passage, and valve means mounted on said actuating rod for controlling the selective connection of said third passage to said second fluid pressure inlet passage and said drain passage so that upon movement of said follow-up piston, said reset piston will return said follow-up piston to a neutral position irrespective of whether said first or second fluid pressure be greater.

6. The combination defined by claim 5 in which said valve means includes a pair of control valve members and a pair of metering lands controlling the flow of pressure fluid to and from said third passage, and additional passages controlled by said valve members for by-passing said metering lands upon a relatively great change in the position of said follow-up piston.

7. For use with an induction system of a supercharged aircraft engine having an intake manifold, a carburetor for supplying a combustible mixture to said engine through said intake manifold, and operable means for injecting a supplemental fluid for suppressing predetonation of said engine; the combination comprising pilot operative means for selecting a desired manifold pressure for the engine, means for controlling the manifold pressure, manifold pressure responsive means for adjusting said control means so as to maintain the selected manifold pressure, atmospheric pressure responsive means, means responsive to operation of said fluid injection means, servomotor means operably connecting said fluid injection responsive means and said atmospheric pressure responsive means jointly to said selecting means so as to vary the maximum permissible limit of the value of said selected manifold pressure in accordance with the prevailing atmospheric pressure and the operative condition of said fluid injection means.

8. For use with an induction system of a supercharged aircraft engine having an intake manifold, a carburetor for supplying a combustible mixture to said engine through said intake manifold, and operable means for injecting a supplemental fluid for suppressing predetonation of said engine; the combination comprising pilot operative means for selecting a desired manifold pressure for the engine, means for controlling the manifold pressure, manifold pressure responsive means for adjusting said control means so as to maintain the selected manifold pressure, atmospheric pressure responsive means, a first servomotor means controlled by said atmospheric pressure responsive means, means responsive to operation of said fluid injection means, a second servomotor means controlled by said fluid injection responsive means, an adjustable member positioned jointly by said first and second motor means and arranged so as to limit the maximum permissible value of said selected manifold pressure in accordance with changes in atmospheric pressure and the operative condition of said fluid injection means.

9. The combination defined by claim 8 in which there is provided a third servomotor means for limiting the adjustment by said first servomotor means of said maximum permissible value, and said third servomotor means controlled by said fluid injection responsive means.

10. An engine control system comprising pilot operative means for selecting a desired manifold pressure for the engine, means for controlling the manifold pressure, manifold pressure responsive means for adjusting said control means so as to maintain the selected manifold pressure, atmospheric pressure responsive means, servomotor means operably connected to said atmospheric pressure responsive means, an adjustable member positioned by said motor means and arranged so as to limit the maximum permissible value of said selected manifold pressure in accordance with changes in atmospheric pressure, a pair of pistons hydraulically operated in parallel, one of said pistons limiting the adjustment of said motor means, a walking beam connecting said motor means and said other piston to said adjustable member, and valve means for jointly operating said pistons.

11. An engine control system comprising pilot operative means for selecting a desired intake manifold pressure for the engine, means for controlling the intake manifold pressure, manifold pressure responsive means for adjusting said control means so as to maintain the selected manifold pressure, said selecting means including an adjustable plate, an arm affixed to the plate, an adjustable member for engaging said arm so as to limit the maximum selected pressure, servomotor means for positioning said adjustable member, and atmospheric pressure responsive means for controlling said motor means so as to decrease the maximum permissible selected intake manifold pressure with increase in altitude.

12. A regulator for the induction system of a supercharged aircraft engine, comprising a first piston, a second piston, a common hydraulic pressure chamber for said pistons, induction pressure responsive means for controlling the hydraulic pressure applied to said chamber, said first piston arranged to be actuated in a first sense at a first differential hydraulic pressure, said second piston arranged to be actuated in a second sense at a greater differential hydraulic pressure upon said first piston being actuated in said first sense to adjust an induction throttle valve for said engine, another member adjustably positioned by the second piston for controlling the driven speed of an engine supercharger, means for changing the datum of the pressure responsive means, a follow-up piston hydraulically coupled in parallel to said second piston, means connecting said follow-up piston to said datum changing means so as to prevent hunting of said pressure responsive means upon a change in the greater differential pressure effecting said second piston, a piston for resetting said follow-up piston, said follow-up piston controlling the operation of said reset piston so as to effect rapid acceleration of said supercharger upon a relatively great increase in the induction pressure being required.

13. The combination defined by claim 12 including means mechanically connecting said reset and follow-up pistons so that under conditions of said first differential hydraulic pressure said reset and follow-up pistons may be maintained out of operation and in a neutral position.

14. A regulator for the induction system of a supercharged aircraft engine, comprising pilot operative means for selecting a desired intake manifold pressure for the engine, hydraulic motor means for controlling the intake manifold pressure, manifold pressure responsive means for adjusting said control means so as to maintain the selected manifold pressure, said selecting means including an adjustable plate, an arm affixed to the plate, an adjustable member for engaging said arm so as to limit the maximum selected pressure, a second motor means for positioning said adjustable member, atmospheric pressure responsive means for controlling said motor means so as to decrease the maximum permissible selected intake manifold pressure with increase in altitude, a follow-up piston operated in response to the differential pressures operating said first mentioned motor means, an actuating rod connecting said follow-up piston to said selector plate for varying the selected pressure, a reset piston, valve means mounted on the actuating rod for controlling the reset piston, and resilient spring means between the reset and follow-up pistons for adjustment by the reset piston to return the follow-up piston to a neutral position.

15. A system of control for a supercharged internal combustion engine comprising, in combination, a throttle valve controller having datum adjusting means providing for selection of an engine intake pressure to be maintained and motor means under control by the engine intake pressure and by said datum adjusting means for so positioning the engine throttle valve as to obtain the selected pressure, a control lever for operating the datum adjusting means, a supercharger connected with the engine intake, variable speed means for driving the supercharger and having a speed changing element, said motor means under control by said engine intake pressure and by said datum adjusting means for so positioning the speed changing element as to give a supercharger speed necessary to obtain the selected pressure at varying altitudes, apparatus for effecting the injection of a liquid into the engine intake, limiting means, atmospheric pressure responsive control means to variably position said limiting means in proportion to said atmospheric pressure, and said limiting means normally operative by said control means to limit the selected engine intake pressure to values required for safe operation of the engine without liquid injection and under the prevailing atmospheric pressure conditions, and injection liquid pressure responsive means for disabling said limiting means upon operation of said injection apparatus.

16. For use in controlling the pressure maintained in the fuel mixture intake of a supercharged internal combustion aircraft engine in which means are provided for injecting an anti-detonant into said intake; a control apparatus comprising an adjustable pressure selecting member for selecting the pressure to be maintained, atmospheric pressure responsive means, motor means controlled by said last mentioned means, stop means adjustably positioned by said motor means so as to limit the selected pressure to predetermined values variable in proportion to the prevailing atmospheric pressure conditions, means for disabling said stop means including other motor means controlled by said anti-detonant injecting means to render said stop means ineffective so as to permit said selecting means to select pressures in excess of said predetermined values during operation of said anti-detonant injecting means.

17. The combination defined by claim 16 in which said disabling means includes an injection liquid pressure responsive switch means, electromagnetic servovalve means controlled by said switch means, and servomotor means controlled by said servovalve means for disabling said limiting means under liquid pressure conditions sufficient to normally effect operation of the injection apparatus.

18. For use in controlling the pressure maintained in the fuel mixture intake of an internal combustion aircraft engine in which means are provided for injecting an anti-detonant into said intake and including an air inlet section, a throttle, and a variable capacity supercharging system; the combination comprising motor means for actuating the throttle and for varying the capacity of the supercharging system, means for controlling the motor means so as to maintain the engine charging pressure at a selected value, manually operable means for selecting the pressure to be maintained, a stop member for limiting the selected pressure to predetermined values for safe operation of the engine, another motor for adjustably positioning said stop member, a capsule, means for subjecting the capsule to a variable pressure including a pressure transmitting passageway connected to the induction passage anterior to the throttle and supercharging system, second motor means operatively connected to said capsule for varying the position of said stop member in proportion to said variable pressure, anti-detonant pressure responsive means, and third motor means controlled by said last-mentioned means to override the second motor means and actuate the stop member to an ineffective position during operation of said anti-detonant injecting means.

HOWARD ALLAN ALEXANDERSON.
ARTHUR HIBBARD LE FEBVRE.

REFERENCES CITED

The following references are of record in the file of this patent:

UNITED STATES PATENTS

| Number | Name | Date |
|---|---|---|
| 2,187,737 | Gregory | Jan. 23, 1940 |
| 2,217,364 | Halford et al. | Oct. 8, 1940 |
| 2,284,687 | Schimanek | June 2, 1942 |
| 2,400,306 | Hobbs | May 14, 1946 |
| 2,400,307 | Hobbs et al. | May 14, 1946 |
| 2,453,170 | Wheeler | Nov. 9, 1948 |
| 2,491,482 | Dolza et al. | Dec. 20, 1949 |
| 2,491,484 | Dolza et al. | Dec. 20, 1949 |
| 2,491,497 | Jorgensen et al. | Dec. 20, 1949 |